(12) United States Patent
Milton et al.

(10) Patent No.: US 8,707,244 B1
(45) Date of Patent: Apr. 22, 2014

(54) METHODS AND SYSTEMS FOR PERFORMING SIGNAL ACTIVITY EXTRACTION

(75) Inventors: David Ian M. Milton, Brooklin (CA); Alexander Grbic, San Jose, CA (US)

(73) Assignee: Altera Corporation, San Jose, CA (US)

( * ) Notice: Subject to any disclaimer, the term of this patent is extended or adjusted under 35 U.S.C. 154(b) by 915 days.

(21) Appl. No.: 12/860,827

(22) Filed: Aug. 20, 2010

(51) Int. Cl.
*G06F 17/50* (2006.01)
*G06F 11/22* (2006.01)
*G06F 9/455* (2006.01)

(52) U.S. Cl.
USPC ............................. 716/136; 716/132; 716/133

(58) Field of Classification Search
USPC .......................................... 716/136, 132, 133
See application file for complete search history.

(56) References Cited

U.S. PATENT DOCUMENTS

| | | | |
|---|---|---|---|
| 6,515,508 B1 | 2/2003 | Chang et al. | |
| 6,611,945 B1 * | 8/2003 | Narasimhan et al. | 716/103 |
| 6,661,235 B2 | 12/2003 | Rokunohe et al. | |
| 6,842,040 B1 | 1/2005 | Chang et al. | |
| 7,242,229 B1 | 7/2007 | Starr et al. | |
| 7,260,808 B1 * | 8/2007 | Pasqualini | 716/104 |
| 7,317,644 B1 | 1/2008 | Lin et al. | |
| 7,440,532 B1 | 10/2008 | Chang | |
| 7,453,968 B2 | 11/2008 | Chang et al. | |
| 7,490,302 B1 * | 2/2009 | Rahman et al. | 716/100 |
| 7,539,900 B1 | 5/2009 | Plofsky | |
| 7,555,741 B1 | 6/2009 | Milton et al. | |
| 7,557,608 B2 | 7/2009 | Lee et al. | |
| 7,623,609 B2 | 11/2009 | Chang et al. | |
| 7,840,918 B1 * | 11/2010 | Duthou | 716/132 |
| 7,865,860 B2 * | 1/2011 | Sawano | 716/126 |
| 8,201,121 B1 * | 6/2012 | Sankaralingam et al. | 716/109 |
| 2006/0225020 A1 * | 10/2006 | Chandrakasan et al. | 716/17 |
| 2007/0234266 A1 * | 10/2007 | Chen et al. | 716/13 |
| 2008/0069276 A1 | 3/2008 | Wong et al. | |

OTHER PUBLICATIONS

U.S. Appl. No. 11/414,933, filed May 1, 2006, entitled "Method and Apparatus for Deriving Signal Activities for Power Analysis and Optimization" by David Neto et al.
U.S. Appl. No. 11/414,803, filed May 1, 2006, entitled "Method and Apparatus for Deriving Signal Activities for Power Analysis and Optimization", by David Neto et al.
U.S. Appl. No. 11/414,855, filed May 1, 2006, entitled "Method and Apparatus for Deriving Signal Activities for Power Analysis and Optimization", by David Neto et al.

* cited by examiner

*Primary Examiner* — Vuthe Siek
*Assistant Examiner* — Magid Dimyan
(74) *Attorney, Agent, or Firm* — Weaver Austin Villeneuve & Sampson LLP (57) ABSTRACT

In one aspect, a technique for performing signal activity extraction in an integrated circuit an integrated circuit is described. The integrated circuit includes multiple nodes. The technique includes compiling a design of the integrated circuit, estimating signal activities at the nodes, determining a node of interest from the nodes, and connecting a signal activity circuit to the node of interest. The determination of the node of interest and the connection of the signal activity circuit to the node of interest first compared to the remaining nodes of the integrated circuit improves efficiency in determining nodes of the integrated circuit at which signals can be analyzed first. Such signal activity extraction may involve power analysis and power optimization.

18 Claims, 9 Drawing Sheets

METHODS AND SYSTEMS FOR PERFORMING SIGNAL ACTIVITY EXTRACTION

FIELD OF THE INVENTION

The present disclosure generally relates to integrated circuits. More particularly, the present disclosure relates to techniques and systems for performing signal activity extraction in an integrated circuit.

BACKGROUND

Programmable logic devices are a type of integrated circuit that can be programmed by a designer to implement a desired custom logic function. In a typical scenario, a logic designer uses computer-aided design (CAD) tools to design a custom logic circuit. These tools use information on the hardware capabilities of a given programmable logic device to help the designer implement the custom logic circuit using multiple resources available on that given programmable logic device. To ensure that the customized programmable logic device performs satisfactorily, the computer-aided design tools optimize placement and routing of resources on the device.

To satisfy the needs of system designers, programmable logic devices are being developed that contain increasingly large amounts of circuit resources. Although such devices are able to implement complex circuit designs, these devices also tend to consume large amounts of power. Circuits that consume too much power can create thermal management problems and can adversely affect system performance.

One of the largest contributors to power consumption on an integrated circuit is dynamic power. Dynamic power is consumed when a signal toggles between high and low values. Dynamic power consumption scales with the product of load capacitance and signal switching frequency. As a result, dynamic power consumption increases as a capacitive load being driven increases and as a frequency at which a particular logic signal toggles increases.

Conventional computer-aided-design tools for designing customized circuits for programmable logic devices are generally unable to help a system designer reduce dynamic power consumption. System designers are therefore unable to make informed decisions regarding tradeoffs between dynamic power consumption, timing performance, and circuit real estate consumption.

SUMMARY OF THE INVENTION

In one aspect, a technique for performing signal activity extraction in an integrated circuit an integrated circuit is described. The integrated circuit includes multiple nodes. The technique includes compiling a design of the integrated circuit, estimating signal activities at the nodes, determining a node of interest from the nodes, and connecting a signal activity circuit to the node of interest. The determination of the node of interest and the connection of the signal activity circuit to the node of interest first compared to the remaining nodes of the integrated circuit improves efficiency in determining nodes of the integrated circuit at which signals can be analyzed first. Such signal activity extraction may involve power analysis and power optimization.

BRIEF DESCRIPTION OF THE DRAWINGS

The invention may best be understood by reference to the following description taken in conjunction with the accompanying drawings, which illustrate specific embodiments of the present systems and techniques.

DETAILED DESCRIPTION

Figure 1:
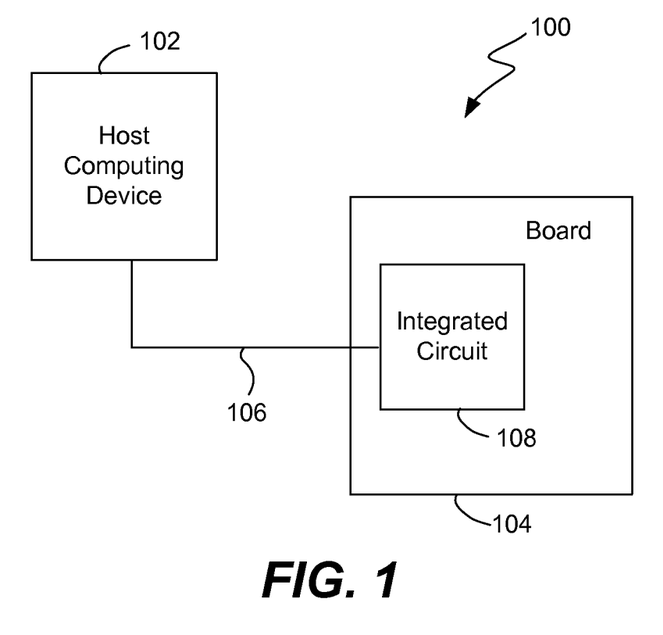
FIG. 1 is a block diagram of an embodiment of a system for performing signal activity extraction.

FIG. 1 is a block diagram of an embodiment of a system 100 for performing signal activity extraction. Applications of signal activity extraction include power analysis and power optimization. System 100 includes a host computing device 102, a board 104, and a cable 106. An integrated circuit 108 is integrated onto board 104 and is connected via cable 106 to host computing device 102. Integrated circuit 108 is a programmable logic device (PLD), such as a field programmable gate array (FPGA). Cable 106 is a debug cable, such as a Joint Test Action Group (JTAG) cable, which may be USB-Blaster™ available from Altera Corporation or Byte-Blaster™ also available from Altera Corporation.

Host computing device 102 may be a computer, a cell phone, a tablet, or a Personal Digital Assistant (PDA). Host computing device 102 includes configuration information used to configure integrated circuit 108 to configure integrated circuit 108. Host computing device 102 sends the configuration information via cable 106 to integrated circuit 108. Integrated circuit 108 performs certain logic, such as binary addition, transmission of signals, filtration of signals, or reception of signals, according to the configuration data. Host computing device 102 reads data, such as counts, received from a signal activity circuit, described below. A signal activity includes a toggle rate and/or a static probability, both of which are also described below. The signal activity circuit is connected to integrated circuit 108.

In another embodiment, integrated circuit 108 is a combination of an Application Specific Integrated circuit (ASIC) and a PLD. In an alternative embodiment, integrated circuit 108 is an ASIC.

Figure 2:
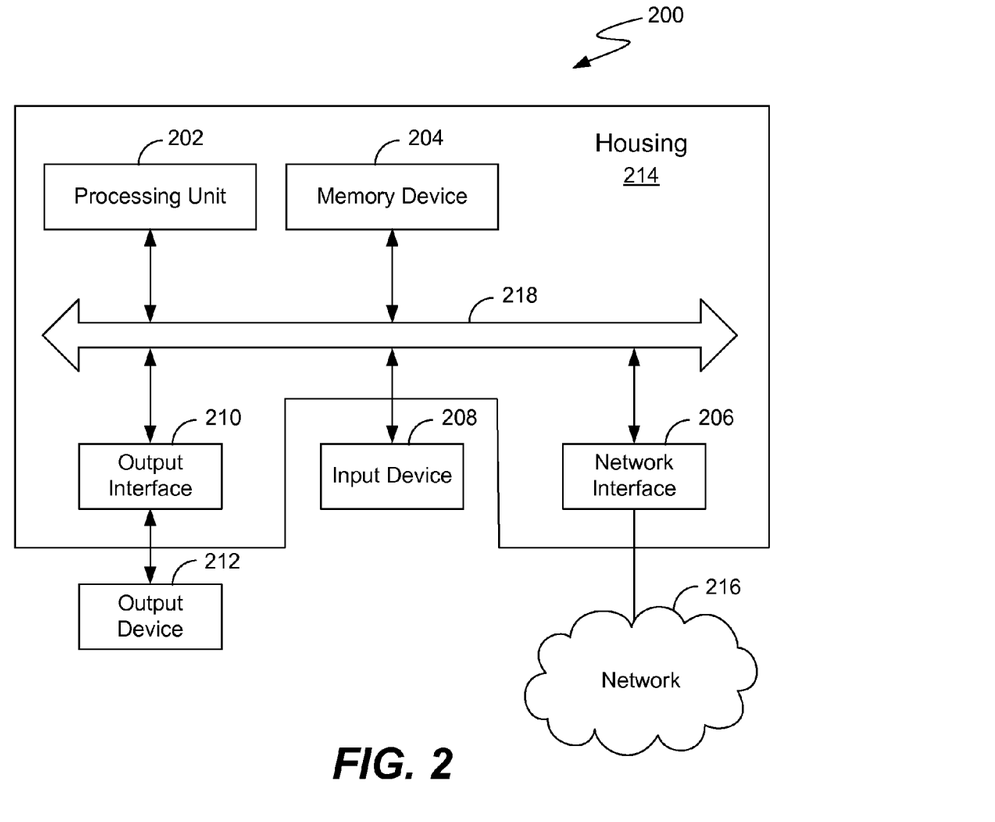
FIG. 2 is a block diagram of another embodiment of a system for performing signal activity extraction.

FIG. 2 is a block diagram of a system 200 for performing signal activity extraction in an integrated circuit, such as a programmable logic device (PLD). System 200 includes a processing unit 202, a memory device 204, a network interface 206, an input device 208, an output interface 210, and an output device 212. Network interface 206, output interface 210, memory device 204, and processing unit 202 are located within a housing 214 of system 200. Board 104 (FIG. 1) is located outside housing 214.

Housing 214 is an exemplary housing of host computing device 102 (FIG. 1). For example, host computing device 102 includes housing 214 that encloses network interface 206, output interface 210, memory device 204, and processing unit 202.

Processing unit 202 may be a central processing unit (CPU), a microprocessor, a floating point coprocessor, a graphics coprocessor, a hardware controller, a microcontroller, a programmable logic device programmed for use as a controller, a network controller, or other processing unit. Memory device 204 may be a random access memory (RAM), a read-only memory (ROM), or a combination of RAM and ROM. For example, memory device 204 includes a computer-readable medium, such as a floppy disk, a ZIP™ disk, a magnetic disk, a hard disk, a compact disc-ROM (CD-ROM), a recordable CD, a digital video disc (DVD), or a flash memory. Memory device 204 stores a set of techniques, described herein, for performing signal activity extraction in integrated circuit 108.

Network interface 206 may be a modem or a network interface card (NIC) that allows processing unit 202 to communicate with a network 216, such as a wide area network (WAN) or a local area network (LAN). Processing unit 202 may be connected via a wireless connection or a wired connection to network 216. Examples of the wireless connection include a connection using Wi-Fi protocol or a WiMax protocol. The Wi-Fi protocol may be an IEEE 802.11, IEEE 802.11a, IEEE 802.11b, IEEE 802.11g, or IEEE 802.11i protocol. Examples of input device 208 include a mouse, a keyboard, a stylus, or a keypad. Output device 212 may be a liquid crystal display (LCD) device, a plasma display device, a light emitting diode (LED) display device, or a cathode ray tube (CRT) display device. Examples of output interface 210 include a video controller that drives output device 212 to display one or more images based on instructions received from processing unit 202. Processing unit 202 accesses the techniques, described herein, for performing signal activity extraction in integrated circuit 108, from memory device 204 or from a remote memory device (not shown), similar to memory device 204, via network 216, and executes the techniques. Processing unit 202, memory device 204, network interface 206, input device 208, output interface 210, and output device 212 communicate with each other via a bus 218.

In an alternative embodiment, system 200 may not include input device 208 and/or network interface 206.

Figure 3:
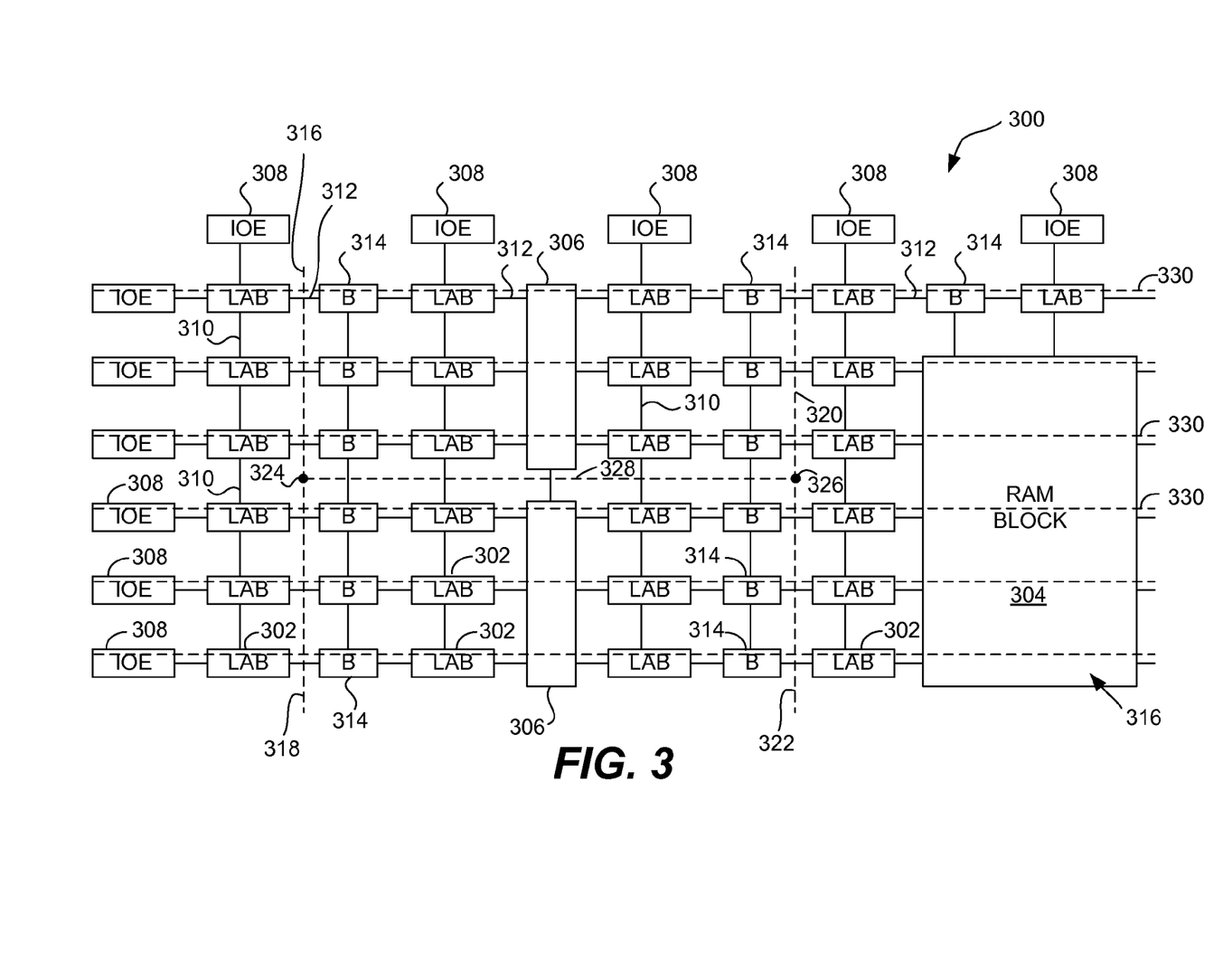
FIG. 3 is a block diagram of an embodiment of a programmable logic device (PLD) that can be configured by using the system of FIG. 2.
Figure 4:
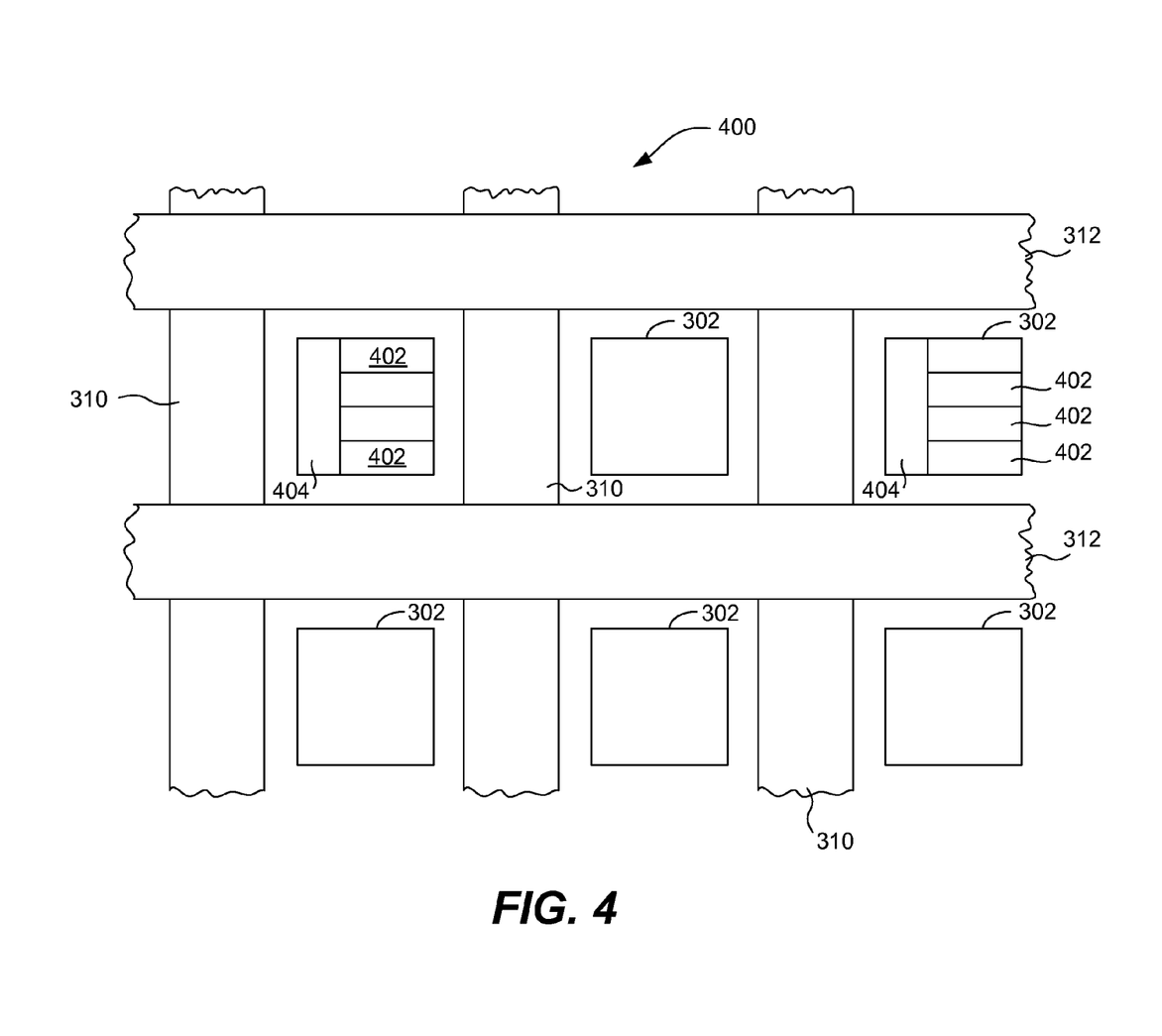
FIG. 4 is a block diagram of an embodiment of a portion of the PLD.

FIG. 3 is a block diagram of an embodiment of a PLD 300 that can be configured by using system 200 of FIG. 2, and FIG. 4 is a block diagram of an embodiment of a portion 400 of PLD 300. In various embodiments, PLD 300 is an electronic design of integrated circuit 108 (FIG. 1).

PLD 300 includes a two-dimensional array of programmable logic array blocks (LABs) 302 that are interconnected by a network of multiple column interconnects 310 and multiple row interconnects 312 of varying length and speed. For the purpose of avoiding clutter in FIG. 2, not all LABs 302 are numbered as 302. LABs 302 include multiple logic elements (LEs) 402 (shown in FIG. 4) and each LE 402 may include one or more registers (not shown). PLD 300 also includes a distributed memory structure including multiple RAM blocks of varying sizes provided throughout the array. The RAM blocks include, for example, a MegaRAM block 304. PLD 300 further includes a set of digital signal processing (DSP) blocks 306 that can implement, for example, multipliers, add features, and/or subtract features. A set of input/output (I/O) elements 308 located around the periphery of PLD 300 support numerous single-ended and differential I/O standards. PLD 300 further includes a set of buffers (Bs) 314 that connect LABs 302. Buffers 314 may be used to store data that is transferred between LABs 302.

A node of PLD 300 may be a register of PLD 300, a RAM block of PLD 300, I/O element 308 of PLD 300, buffer 314 of PLD 300, DSP block 306 of PLD 300, or LAB 302 of PLD 300.

A clock tree 316 is overlaid on PLD 300. Clock tree 316 is shown in dashed lines for maintaining clarity of FIG. 3. An exemplary clock tree is described in U.S. Pat. No. 7,555,741. Clock tree 316 includes a set of clock spine paths 316, 318, 320, and 322. Spines 316 and 318 are coupled at a point 324. Spines 320 and 322 are coupled at a point 326. A clock path 328 is used to couple spines 316 and 318 with spines 320 and 322. Row clock lines 330 are connected at various points to spines 316, 318, 320, and 322. A clock signal is applied via clock tree 316 to one or more nodes of PLD 300.

In an alternative embodiment, PLD 300 does not include MegaRAM block 304. Moreover, in another embodiment, clock tree 316 has different shapes and sizes of clock spine paths than that shown in FIG. 3. In yet another embodiment, more than one clock tree 316 is used to selectively provide one of multiple clock signals of different frequencies and/or phases to PLD 300. A clock tree may be used by a customer of a manufacturer, such as Altera™ Corporation.

Referring to FIG. 4, PLD 300 includes sets 404 of multiple LAB lines and LABs 302. LEs 402 of LAB 302 are connected with each other via set 404 of LAB lines. LAB 302 may be configured as a block of RAM or to implement logic.

Figure 5:
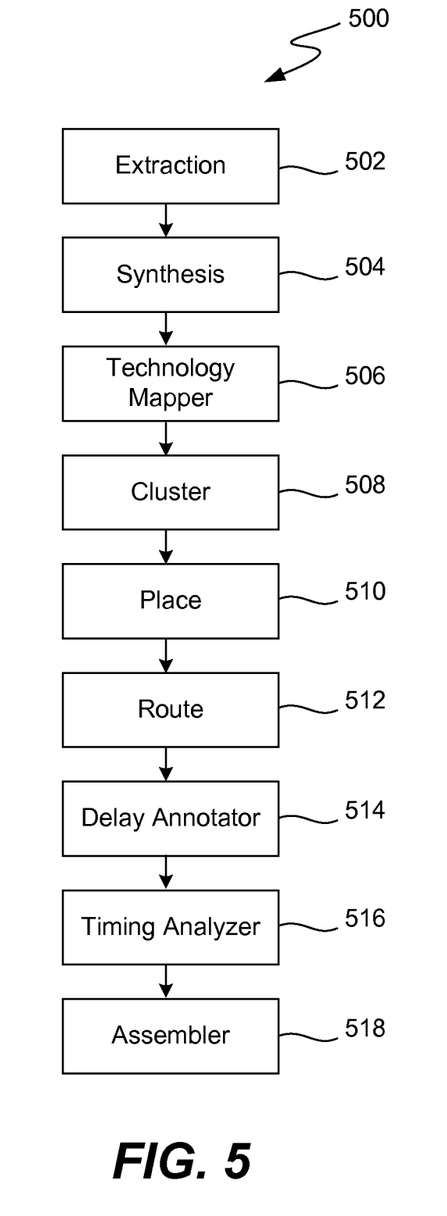
FIG. 5 is a block diagram of an embodiment of a compilation technique used to generate configuration information for configuring the PLD.

FIG. 5 is a block diagram of an embodiment of a compilation technique 500 used to generate the configuration information. Compilation technique 500 includes an extract phase 502, a synthesis phase 504, a technology mapping phase 506, a cluster phase 508, a place phase 510, a route phase 512, a delay annotator phase 514, a timing analysis phase 516, and an assembler phase 518. Processing unit 202 accesses compilation technique 500 stored within memory device 204 or the remote memory device, and executes the compilation technique 500.

Processing unit 202 executes the compilation technique 500 to convert a user design expressed, for example, as a Hardware Description Language (HDL) by a user, into the configuration information used to configure integrated circuit 108 (FIG. 1) to implement the user design. Processing unit 202 executes extract phase 502 to convert the user design into a register transfer layer (RTL) description.

Processing unit 202 executes synthesis phase 504 to convert the register transfer layer description of the user design into a set of logic gates. Processing unit 202 executes technology mapping phase 506 to map the set of logic gates into a set of atoms, which are irreducible constituents of the user design. The atoms may correspond to groups of logic gates and other components of the user design matching the capabilities of LEs 402 or other functional blocks of PLD 300. The user design may be converted into any number of different sets of atoms, depending upon the underlying hardware of integrated circuit 108 (FIG. 1) used to implement the user design.

Processing unit 202 further executes cluster phase 508 to group related atoms together into clusters. Processing unit 202 also executes place phase 510 to assign clusters of atoms to locations on PLD 300. Processing unit 202 executes route phase 512 to determine a configuration of multiple configurable switching circuits of PLD 300 used to connect the atoms implementing the user design. Processing unit 202 executes delay annotator phase 514 to determine multiple signal delays, such as data delays, for the set of atoms and their associated connections in the configurable switching circuits by using a timing model of PLD 300. Processing unit 202 executes timing analysis phase 516 to determine whether the implementation of the user design in PLD 300 will meet multiple long-path and short-path timing constraints specified by the user via input device 208.

Processing unit 202 executes assembler phase 518 to generate the configuration information specifying the configuration of PLD 300 implementing the user design, including the configuration of each LE 402 used to implement the user design and the configuration of the configurable switching circuit used to connect the LEs 402. Processing unit 202 executes assembler phase 518 to write the configuration information to a configuration file, which can be stored within memory device 204 and can then be accessed by host computing device 102 (FIG. 1) to configure integrated circuit 108 (FIG. 1) to implement instances of the user design.

Figure 6:
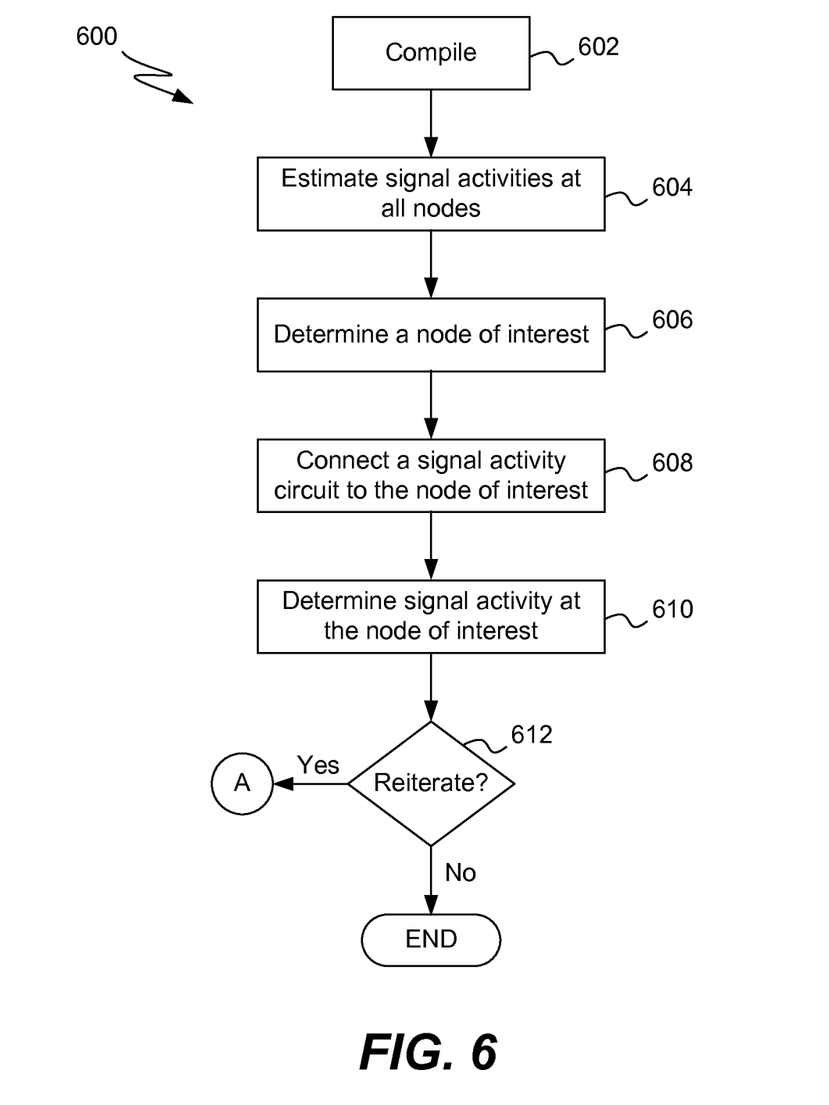
FIG. 6 is a flowchart of an embodiment of a technique for performing signal activity extraction in an integrated circuit of the system of FIG. 1.

FIG. 6 is a flowchart of an embodiment of a technique 600 for performing signal activity extraction in integrated circuit 108. Processing unit 202 executes 602 compilation technique 500 to generate the configuration information used to configure integrated circuit 108.

Processing unit 202 estimates 604 multiple signal activities at all nodes of PLD 300. For example, processing unit 202 estimates 604 static probability at a node of PLD 300 by computing a ratio of a number of clock cycles, for a pre-determined time period, for which a signal output from the node has a pre-determined value, such as 1 or 0, to a total number of clock cycles measured during the pre-determined time period. A signal output from a node is referred to herein as an output signal, which is a data signal and not a clock signal. As an illustration, processing unit 202 calculates static probability of 25% of a signal output from a node of PLD 300 to indicate that the node or the output signal has a value of 1 for 25% of the pre-determined time period. As another example, processing unit 202 calculates static probability of 75% of a signal output from a node of PLD 300 to indicate that the node or the output signal has the pre-determined value of 1 for 75% of the pre-determined time period. The pre-determined time period and the pre-determined value are provided by the user via input device 208 (FIG. 2) and stored in memory device 204 (FIG. 2).

As another example, processing unit 202 estimates 604 a toggle rate of a node of PLD 300 by calculating a ratio of a number of clock cycles during which a signal output from the node toggles, such as transitions, from one value, such as 1 or 0, to a different value, such as 0 or 1, to the total number of clock cycles. For instance, processing unit 202 determines that a signal that transitions from 1 to 0 and back from 0 to 1 during the pre-determined time period, such as, for example, one second, has a toggle rate of 2 transitions per second. Unit of a toggle rate may be transitions per second.

As yet another example, processing unit 202 applies a vectorless signal activity estimation technique to estimate 604 signal activities at all nodes of PLD 300. Examples of vectorless estimation techniques are described in a patent application having application Ser. No. 11/414,933, inventors David Neto et al., filed on May 1, 2006, and titled "Method And Apparatus For Deriving Signal Activities For Power Analysis And Optimization", another patent application having application Ser. No. 11/414,803, inventors David Neto et al., filed on May 1, 2006, and titled "Method And Apparatus For Deriving Signal Activities For Power Analysis And Optimization", and yet another patent application having application Ser. No. 11/414,855, inventors David Neto et al., filed on May 1, 2006, and titled "Method And Apparatus For Deriving Signal Activities For Power Analysis And Optimization".

Processing unit 202 determines 606 a node of interest of PLD 300 from the all the nodes of PLD 300. For example, processing unit 202 determines that a register, I/O element 308, a RAM block, or DSP block 306 (FIG. 3), is a node of interest. In this example, the register is a block and it is difficult to disintegrate the register, the RAM block, and DSP block 306 as combinational logic, such as in the form of multiple gates, which may be AND gate and/or OR gates. Moreover, in this example, the determination of the node of interest is based on whether a node is a block that helps reduce error in power estimation.

As another example, processing unit 202 determines that a node of PLD 300 that has a higher number of fanouts than the remaining fanouts of the remaining nodes of PLD 300 is a node of interest. For instance, if an output of a node P of PLD 300 is directly connected to nodes Q and R and an output of a node S of PLD 300 is directly connected to a node T, Q, or R, processing unit 202 determines that the node P has a higher number of fanouts than a number of fanouts of node S. It is noted that a direct connection is a connection that includes only a conductor, which is described below.

As yet another example, processing unit 202 determines that a node of PLD 300 that has an output connected to a higher number of nodes of PLD 300 downstream from the node is a node of interest. In this example, the higher number of nodes is higher than a number of nodes connected to the remaining nodes of PLD 300. Moreover, in this example, the node of interest may have a higher number of layers of logic than that of the remaining nodes. For instance, if an output of a node A of PLD 300 is directly connected to a node B and connected to a node C via node B, and an output of a node D is directly connected to node C, node A is connected to a higher number of nodes downstream than a number of nodes connected downstream to node D. In this instance, node B, which receives a signal output from node A, is located downstream from node A. Moreover, in this instance, node C, which receives a signal output from node B, is located downstream from node B. Moreover, node C, which receives a signal output from node D, is located downstream from node D. Further, node C, which is affected by a signal output from node A, is located downstream from node A.

As another example, processing unit 202 determines that a node of PLD 300 that has a number of fanouts greater than a pre-determined number of fanouts is a node of interest. The pre-determined number of fanouts is provided by the user via input device 208 (FIG. 2) and stored in memory device 204 (FIG. 2) to be used by processing unit 202. As yet another example, processing unit 202 determines that a node of PLD 300 that is connected downstream to a number of nodes greater than a pre-determined number of downstream nodes is a node of interest. The pre-determined number of nodes is provided by the user via input device 208 (FIG. 2) and stored in memory device 204 (FIG. 2) to be used by processing unit 202.

As another example, processing unit 202 determines that a node of interest is a node of PLD 300 that has an output directly connected to a conductor, such as a wire, of the PLD 300 and the conductor has a capacitance higher than the remaining capacitances of the remaining conductors directly connected to the respective remaining outputs of the remaining nodes of the PLD 300. As still another example, processing unit 202 determines that a node of PLD 300 that is directly connected to a conductor having a capacitance that is greater than a pre-determined capacitance is a node of interest. The pre-determined capacitance is provided by the user via input device 208 (FIG. 2) and stored in memory device 204 (FIG. 2) to be used by processing unit 202. Processing unit 202 may determine a dynamic power consumed by a node as a multiplication of a capacitance of a conductor directly connected to an output of the node, a square of a supply voltage, and a toggle rate of an output signal passing through the conductor, where the toggle rate is estimated at technique 604. The supply voltage is a voltage supplied, by a voltage source (not shown), to the entire PLD 300.

As another example, processing unit 202 determines that a node of PLD 300 that has a lower depth than depths of the remaining nodes of the PLD 300 is a node of interest. For instance, a first node at an input of PLD 300 has a depth of 0, a second node directly connected to an output of the first node has a depth of 1, and a third node directly connected to an output of the second node has a depth of 2. As yet another example, processing unit 202 determines that a node of PLD 300 that has a depth, within PLD 300, greater than a pre-determined depth is a node of interest. The pre-determined depth is provided by the user via input device 208 (FIG. 2) and stored in memory device 204 (FIG. 2) to be used by processing unit 202. Knowing upstream signal activity allows downstream signals to be computed with less error.

As another example, processing unit 202 determines a discrepancy of a first signal activity estimated 604 at a node of PLD 300 and a second signal activity estimated at the node. In this example, the second signal activity is estimated at the node during an iteration preceding an iteration estimating 604 the first signal activity. Further, in this example, processing unit 202 determines whether the discrepancy is greater than a pre-determined discrepancy. Upon determining that the discrepancy is greater than the pre-determined discrepancy, processing unit 202 determines that the node is a node of interest. On the other hand, upon determining that the discrepancy is not greater than the pre-determined discrepancy, processing unit 202 determines that the node is not a node of interest. Moreover, in this example, the determination of the node of interest based on the pre-determined discrepancy helps reduce signal activity error by ensuring that highly volatile signals have samples signal activities. The pre-determined discrepancy is provided by the user via input device 208 (FIG. 2) and stored in memory device 204 (FIG. 2) to be used by processing unit 202.

As yet another example, processing unit 202 determines that a node of interest is a node of PLD 300 that consumes a higher amount of power compared to power consumed by the remaining nodes of the PLD 300. For instance, processing unit 202 determines that a node of PLD 300 consumes the higher amount of power by determining that a result of multiplication of a toggle rate estimated 604 at the node with static probability estimated 604 at the node is greater than the remaining results of multiplications of the remaining toggle rates estimated 604 for the remaining nodes with the remaining static probabilities estimated 604 for the remaining nodes. In this example, this determination of the node of interest by using the higher amount of power helps reduce error in power estimation and provides better insight for power optimization.

Signals of higher interest, such as a signal output at a node of interest, should be prioritized so that higher priority signals are sampled first. To determine a signal of higher interest, it is determined, by using the techniques described herein, how sensitive a power estimate is to change signal activity at a node of PLD 300. A signal that has a high amount of sensitivity causes a large change in a power estimate and should be sampled early because a node to which the signal is output may have a large potential for error.

The determination 606 of a node of interest of PLD 300 is also a determination of a node of interest of integrated circuit 108.

Upon determining 606 a node of interest, processing unit 202 makes a determination to connect a signal activity circuit to an output of the node of interest. Upon receiving the determination to connect a signal activity circuit to an output of a node of interest, the signal activity circuit is physically connected 608 to an output of a node of interest of integrated circuit 108 (FIG. 1) physically located on board 104 (FIG. 1). A single signal activity circuit is connected to a single node of interest. A physical connection is not just an electronic connection. A physical connection is also a mechanical and an electrical connection. A signal activity circuit may be electronically connected to a node of interest of PLD 300 by using a programming language or by manipulating, via input device 208 (FIG. 2), a schematic of a graphical user interface (GUI) on output device 212 (FIG. 2). A signal activity circuit is physically connected to a node of interest physically located within integrated circuit 108 (FIG. 1) that is further physically integrated within board 104 (FIG. 1). PLD 300 (FIG. 3) is an example of an electronic form of integrated circuit 108 that has a physical form.

In an alternative embodiment, processing unit 202 estimates or determines a signal activity at a node of PLD 300 based on static probability at the node and not on a toggle rate at the node. In yet another alternative embodiment, processing unit 202 estimates or determines a signal activity of a node of PLD 300 based on a toggle rate at the node and not on static probability at the node. In an alternative embodiment, processing unit 202 estimates multiple signal activities at multiple, not all, nodes of PLD 300.

In various embodiments, processing unit 202 determines any number of nodes of interest from all or multiple nodes of PLD 300. For example, processing unit 202 determines multiple nodes of interest based on the pre-determined number of fanouts, the predetermined number of downstream nodes, the pre-determined capacitance, the pre-determined depth, or the pre-determined discrepancy.

It is noted that in another embodiment, a plurality of signal circuits are connected to a plurality of nodes of interest and the number of signal circuits determined to be connected depend on real estate area on board 104.

Figure 8:
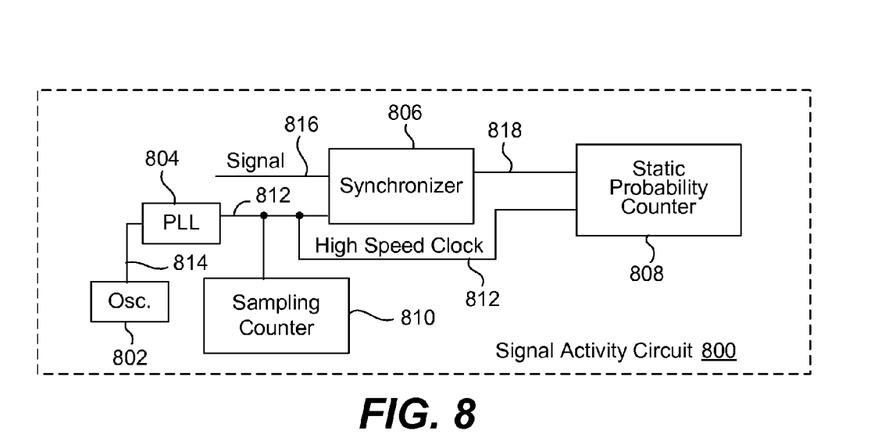
FIG. 8 is a block diagram of an embodiment of a signal activity circuit that can be connected to the integrated circuit.

FIG. 8 is a block diagram of an embodiment of a signal activity circuit 800. Signal activity circuit 800 includes multiple components, such as, an oscillator 802, a phase locked loop (PLL) 804, a synchronizer 806, a static probability counter 808, and a sampling counter 810. A component of any sampling circuit, described herein, is not a node of integrated circuit 108. An exemplary synchronizer is described in U.S. Patent Application Publication No. 2008/0069276 A1 by Wong et al. and published on Mar. 20, 2008. Another example of synchronizer 806 is a processing unit, such as processing unit 202.

Glitching occurs at a time an output signal of a node of interest toggles more than once per clock cycle of a clock signal provided by a clock tree, such as clock tree 316 (FIG. 3). The glitches may be filtered out by downstream logic and eventually terminate at a register of integrated circuit 108. To capture glitching, a high frequency clock signal 812 is used.

Oscillator 802 oscillates to generate high frequency clock signal 814 that has a frequency higher a clock signal applied via clock tree 316 (FIG. 3) or another other clock tree to any node of integrated circuit 108. PLL 804 receives high frequency clock signal 814 from oscillator 802, adjusts a phase of the high-frequency clock signal 814 to match a reference phase to output high frequency signal 812 having the reference phase.

Sampling counter 810 counts a number of clock cycles of high frequency clock signal 812 for the pre-determined time period. Synchronizer 806 receives high frequency clock signal 812 from PLL 804, receives an output signal 816 from a node of integrated circuit 108 (FIG. 1), and synchronizes high frequency clock signal 812 with output signal 816 to output a synchronized output signal 818. For example, synchronizer 806 synchronizes high frequency clock signal 812 with output signal 816 by determining whether a transition of output signal 816 from one value, such as 0 or 1, to another different value, such as 1 or 0, is in phase with high frequency clock signal 812. Upon determining that the transition is out of phase, synchronizer 806 adjusts a phase of the transition to be in phase with high frequency clock signal 812 to output synchronized output signal 818. Moreover, synchronizer 806 determines whether the other value achieved at an end of the transition remains steady for a threshold time period, which is provided by the user via input device 208 (FIG. 2) and may be stored in memory device 204 (FIG. 2). If the other value remains steady for the threshold time period, synchronizer 806 applies the adjustment of the phase. On the other hand, if the other value does not remain steady for the threshold time period, synchronizer 806 does not apply the adjustment.

Static probability counter 808 receives synchronized output signal 818 and high frequency clock signal 812, and counts, for the pre-determined time period, a number of clock cycles of high frequency clock signal 812 from which synchronized output signal 818 has the pre-determined value. For example, static probability counter 808 counts that out of M clock cycles generated during the pre-determined time period, synchronized output signal has the pre-determined value of 1 for N clock cycles to output a count of N, where N and M are integers greater than 0, and N is less than or equal to M. In this example, sampling counter 810 counts the M clock cycles.

Figure 9:
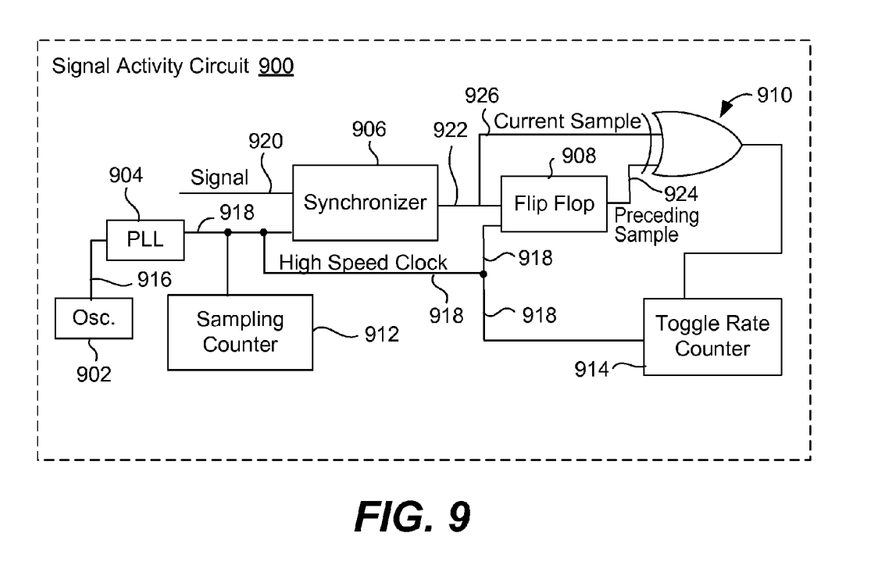
FIG. 9 is a block diagram of an embodiment of another signal activity circuit that can be connected to the integrated circuit.

FIG. 9 is a block diagram of an embodiment of another signal activity circuit 900. Signal activity circuit 900 includes an oscillator 902, a PLL 904, a synchronizer 906, a flip-flop 908, an XOR gate 910, a sampling counter 912, and a toggle rate counter 914. Oscillator 902 and PLL 904 generate a high frequency clock signal 918 in the same manner in which oscillator 802 and PLL 804 (FIG. 8) generate high frequency clock signal 812 (FIG. 8). Sampling counter 912 counts a number of clock cycles of high frequency clock signal 918 in the same manner in which sampling counter 810 (FIG. 8) counts a number of clock cycles of high frequency clock signal 812 (FIG. 8). Synchronizer 906 receives an output signal 920 from a node of integrated circuit 108 and synchronizes the output signal 920 with high frequency clock signal 918 to generate a synchronized output signal 922. Synchronizer 906 synchronizes output signal 920 with high frequency clock signal 918 in the same manner in which synchronizer 806 (FIG. 8) synchronizes output signal 816 (FIG. 8) with high frequency clock signal 812 (FIG. 8).

Flip-flop 908 receives synchronized output signal 922 to output a preceding sample 924. Preceding sample 924 precedes a current sample 926 of synchronized output signal 922 by one clock cycle of high frequency clock signal 918. XOR gate 910 performs an exclusive OR operation on preceding sample 924 and current sample 926 to output an assertion, such as a value of 1, during a clock cycle of high frequency clock signal 918 in which the preceding and current samples 924 and 926 are not matched and to output a deassertion, such as a value of 0, during a clock cycle of high frequency clock signal 918 in which the preceding and current samples 924 and 926 are the same.

Toggle rate counter 914 receives any assertion and/or deassertion from XOR gate 910 and counts, for the pre-determined time period, a number of clock cycles of high frequency clock signal 918 during which the assertions are received to output a count of the assertions.

Figure 10:
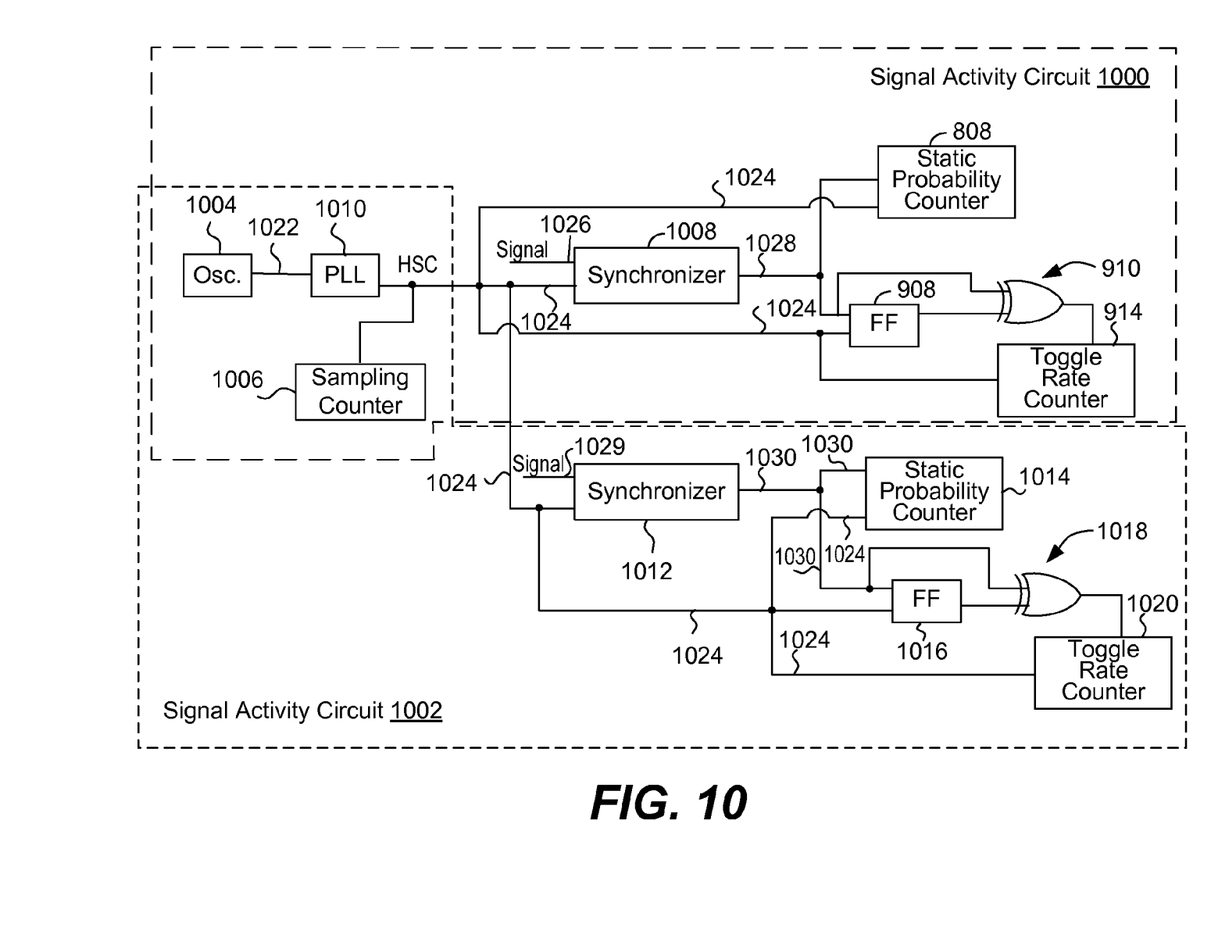
FIG. 10 is a block diagram of an embodiment of multiple signal activity circuits that can be connected to the integrated circuit.

FIG. 10 is a block diagram of an embodiment of a signal activity circuit 1000 and another signal activity circuit 1002. Signal activity circuit 1000 includes an oscillator 1004, a sampling counter 1006, a synchronizer 1008, static probability counter 808 (FIG. 8), flip-flop 908 (FIG. 9), XOR gate 910 (FIG. 9), toggle rate counter 914 (FIG. 9), and a PLL 1010. Oscillator 1004 may be oscillator 802 (FIG. 8) or oscillator 902 (FIG. 9), PLL 1010 may be PLL 804 (FIG. 8) or PLL 904 (FIG. 9). Sampling counter 1006 may be sampling counter 810 (FIG. 8) or sampling counter 912 (FIG. 9), and synchronizer 1008 may be synchronizer 806 (FIG. 8) or synchronizer 906 (FIG. 9).

Signal activity circuit 1002 includes oscillator 1004, PLL 1010, sampling counter 1006, a synchronizer 1012, a static probability counter 1014, another flip flop 1016, an XOR gate 1018, and a toggle rate counter 1020.

It is noted that a single oscillator 1004, PLL 1010, sampling counter 1006, and synchronizer 1008 is used with both static probability counter 808 and toggle rate counter 914. Each of oscillator 1004, PLL 1010, sampling counter 1006, and synchronizer 1008 is shared by toggle rate counter 914 and static probability counter 808. A high frequency clock signal 1022 generated by oscillator 1004 may be high frequency clock signal 814 (FIG. 8) or high frequency clock signal 916 (FIG. 9). A high frequency clock signal 1024 generated by PLL 1010 may be high frequency clock signal 812 (FIG. 8) or high frequency clock signal 918 (FIG. 9).

An output signal 1026 received by synchronizer 1008 may be output signal 816 (FIG. 8) or output signal 920 (FIG. 9). A synchronized output signal 1028 output by synchronizer 1008 may be synchronized output signal 818 (FIG. 8) or synchronized output signal 922 (FIG. 9). Static probability counter 808 and toggle rate counter 914 count with respect to the same high frequency clock signal 1024.

Synchronizer 1012 synchronizes an output signal 1029, output by a node of integrated circuit 108 (FIG. 1), with high frequency clock signal 1024 in the same manner in which synchronizer 806 (FIG. 8) synchronizes high frequency clock signal 812 (FIG. 8) with output signal 816 (FIG. 8) received from a node of integrated circuit 108. Output signal 1026 is received from a node of integrated circuit 108 (FIG. 1) different than a node, of integrated circuit 1008, from which output signal 1029 is received. Synchronizer 1010 synchronizes output signal 1029 with high frequency clock signal 1024 to generate a synchronized output signal 1030. Static probability counter 1014 counts, for the pre-determined time period, a number of clock cycles of high frequency clock signal 1024 for which synchronized output signal 1030 has the pre-determined value. Static probability counter 1014 counts in the same manner in which static probability counter 808 counts with respect to high frequency clock signal 1024 and synchronized output signal 1028.

Moreover, toggle rate counter 1020 counts, for the pre-determined time period, a number of clock cycles of high frequency clock signal 1024 during which synchronized clock signal 1030 toggles from one value to another value. It is noted that oscillator 1004, PLL 1010, high frequency clock signal 1024, and sampling counter 1006 are shared by signal activity circuits 1000 and 1002. For example, oscillator 1004, PLL 1010, high frequency clock signal 1024, and sampling counter 1006 are shared by toggle rate counters 914 and 1020 and by static probability counters 808 and 1014.

In an alternative embodiment, signal activity circuits 800, 900, 1000, and 1002 (FIG. 8-10) do not include a PLL.

Referring back to FIG. 6, processing unit 202 (FIG. 2) determines 610 signal activity at a node of interest to which a signal activity circuit is connected. For example, processing unit 202 obtains a first count counted during the pre-determined time period from static probability counter 808 (FIG. 8), a second count counted during the pre-determined time period from sampling counter 810 (FIG. 8), and divides the first count by the second count to compute static probability at a node of interest of integrated circuit 108. In this example, host computing device 102 (FIG. 1) receives the first and second counts from integrated circuit 108 via cable 106 (FIG. 1) and stores the first and second counts in memory device 204 (FIG. 2). In this example, the static probability at the node of interest is the same as static probability of output signal 816 (FIG. 8). As another example, processing unit 202 obtains a third count counted during the pre-determined time period from toggle rate counter 914 (FIG. 9), a fourth count counted during the pre-determined time period from sampling counter 912 (FIG. 9), and divides the third count by the fourth count to calculate a toggle rate at a node of interest of integrated circuit 108. In this example, the toggle rate at the node of interest is the same as toggle rate of output signal 920 (FIG. 9).

Signal activity determination 610 is made upon connecting a signal activity circuit, such as signal activity circuit 800 (FIG. 8) and/or signal activity circuit 900 (FIG. 9) to a node of interest of integrated circuit 108 at a time integrated circuit 108 is located on board 104 (FIG. 1). Signal activity determination 610 is made at a node of interest that is located on board 104 after configuring integrated circuit 108 based on the configuration information compiled using the compilation technique 500. Signal activity determination 610 is not based only on an electronic design of integrated circuit 108.

Processing unit 202 determines 612 whether to reiterate performing techniques similar to techniques 608 and 610. For example, processing unit 202 determines that signal activities at all nodes of integrated circuit 108 (FIG. 1) are determined 610 and determines 612 not to reiterate. Otherwise, upon determining, by processing unit 202, that signal activities at all nodes of integrated circuit 108 are not determined, processing unit 202 determines 612 to reiterate.

As another example, processing unit 202 determines that signal activities at all nodes of interest of PLD 300 are determined 610 and determines not to reiterate. On the other hand, upon determining, by processing unit 202, that signal activities at all nodes of interest of PLD 300 are not determined 610, processing unit 202 determines to reiterate.

As yet another example, processing unit 202 determines a difference between a first amount of power calculated at a node of interest from signal activity estimated 604 and a second amount of power calculated at the node of interest from signal activity that is determined at technique 610. Processing unit 202 determines the second amount of power from signal activity that is determined 610 in the same manner in which processing unit 202 determines the first amount of power from signal activity estimated at technique 604. Upon determining that the difference is not greater than a first pre-determined difference, processing unit 202 determines 612 not to reiterate. On the other hand, upon determining, by processing unit 202, that the difference is greater than the first pre-determined difference, processing unit 202 determines 612 to reiterate.

As another example, processing unit 202 determines a difference between signal activity, such as a toggle rate or static probability, estimated 604 at node of interest of PLD 300 and signal activity, such as toggle rate or static probability, determined 610 at the node of interest of integrated circuit 108, determines whether the difference is not greater than a second pre-determined difference, and if so, determines not to reiterate. On the other hand, upon determining, by processing unit 202 that the difference is greater than the second pre-determined difference, processing unit 202 determines to reiterate. Processing unit 202 receives the first pre-determined difference and/or the second pre-determined difference from the user via input device 208 (FIG. 2) and the first and/or second pre-determined difference may be stored in memory device 204 (FIG. 2).

Upon determining 612 not to reiterate, processing unit 202 ends technique 600. On the other hand, upon determining 612 to reiterate, processing unit 202 makes a determination to connect a signal activity circuit to the remaining nodes, of integrated circuit 108, other than a node of interest determined at technique 610 (FIG. 6). It is noted that processing unit 202 makes a determination to connect a single signal activity circuit to a single node of integrated circuit 108.

Figure 7:
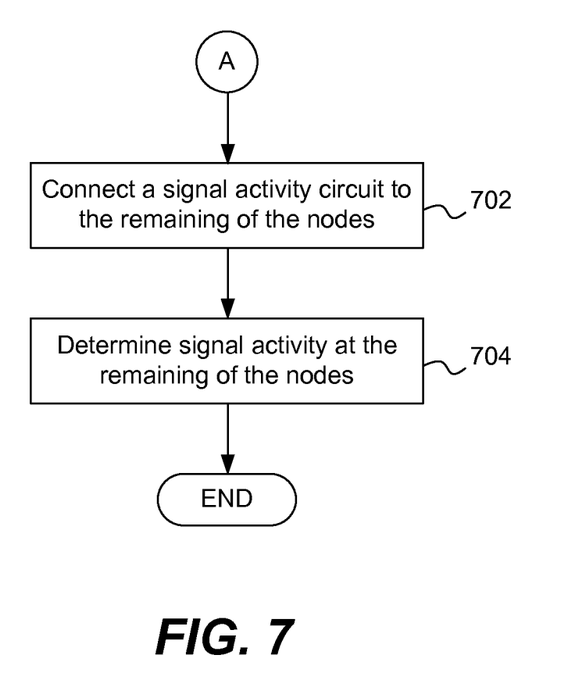
FIG. 7 is a continuation of the flowchart of FIG. 6.

Referring to FIG. 7, upon making a determination to connect a signal activity circuit to the remaining nodes, the signal activity circuit is connected 702 to integrated circuit 108 (FIG. 1) located on board 104 (FIG. 1). Integrated circuit 108 is located on board 104 (FIG. 1) and not in an electronic form, such as one displayed on output device 212 (FIG. 1), but rather is in a physical form. A signal activity circuit is connected (FIG. 6) to the remaining nodes in the same manner in which a signal activity circuit is connected 608 (FIG. 6) to a node of interest.

Processing unit 202 determines 704 signal activity at the remaining nodes upon receiving a count from static probability counter 808 (FIG. 8) and a count from sampling counter 810 (FIG. 8) and/or upon receiving a count from toggle rate counter 914 (FIG. 9) and/or a counter from sampling counter 912 (FIG. 9). Processing unit 202 determines 704 signal activities at the remaining nodes in the same manner in which processing unit 202 determines 610 (FIG. 6) signal activity at a node of interest. It is noted that a number of signal activity circuits connected to the remaining nodes may depend on real estate area on board 104 (FIG. 1).

Processing unit 202 may determine to optimize power consumption by a node of PLD 300 based on signal activities determined at 610 and 704. For example, upon determining that a static probability at a node of interest is high, such as greater than 0.5, processing unit 202 determines to place, during place phase 510 (FIG. 5), the node at a difference location to reduce power consumed by the node. Generally, if toggle rate increases or static probability increases at a node, power consumed by the node increases. Similarly, if toggle rate decreases or static probability decreases at a node, power consumed by the node decreases. As another example, upon determining that a toggle rate at a node is high, such as greater than Z number of transitions per second, at a node of integrated circuit 108, processing unit 202 determines to change routing to avoid use of the node to reduce power consumption by integrated circuit 108. Z is an integer greater than 0. Reducing power consumption at a node of integrated circuit 108 (FIG. 1) results in power optimization of power consumed by integrated circuit 108.

Technical effects of the herein described systems and techniques for performing signal activity extraction include determining signal activity at a node of interest efficiently and/or by considering glitching. For example, a signal activity is efficiently determined by determining a node of interest and/or by determining signal activity, first, at the node of interest compared to determining signal activities at the remaining nodes of integrated circuit 108.

Although the foregoing systems and techniques have been described in detail by way of illustration and example for purposes of clarity and understanding, it will be recognized that the above described systems and techniques may be embodied in numerous other specific variations and embodiments without departing from the spirit or essential characteristics of the systems and techniques. Certain changes and modifications may be practiced, and it is understood that the systems and techniques are not to be limited by the foregoing details, but rather is to be defined by the scope of the appended claims.

What is claimed is:

1. A method for performing signal activity extraction in an integrated circuit, comprising:
   compiling a design of the integrated circuit including a plurality of nodes;
   estimating signal activities at the nodes;
   determining a node of interest from the nodes; and
   physically connecting a signal activity circuit at an output of the node of interest; wherein said physically connecting comprises:
      connecting a synchronizer at the output of the node of interest;
      connecting a static probability counter at an output of the synchronizer; and
      supplying a clock signal to a clock input of the synchronizer and to a clock input to the static probability counter.

2. A method in accordance with claim 1, further comprising optimizing power consumed by the node.

3. A method in accordance with claim 1, further comprising foregoing determination of signal activities at the remaining nodes.

4. A method in accordance with claim 1, wherein said connecting the signal activity circuit comprises:
   connecting a flip-flop to the output of the synchronizer;
   connecting a gate to an output of the flip-flop;
   connecting a toggle rate counter to an output of the gate; and
   supplying a clock signal to a clock input of the flip-flop and to a clock input of the toggle rate counter.

5. A method in accordance with claim 4, further comprising determining, for a pre-determined time period, a total number of clock cycles of the clock signal by sampling the clock signal at each of the clock cycles.

6. A method in accordance with claim 5, further comprising:
   counting, by the toggle rate counter for the pre-determined time period, a number of clock cycles an output signal received by the synchronizer toggles, wherein the output signal is a data signal; and
   determining a toggle rate by dividing the number of clock cycles the output signal toggles by the total number of clock cycles.

7. A method in accordance with claim 6, wherein the integrated circuit includes a programmable logic device.

8. A method in accordance with claim 6, further comprising:
   counting, by the static probability counter for the predetermined time period, a number of clock cycles the output signal received by the synchronizer has a pre-determined value; and
   determining a static probability by dividing the number of clock cycles during which the output signal has the pre-determined value by the total number of clock cycles.

9. A method in accordance with claim 1, wherein said determining the node of interest comprises:
   determining that one of the nodes is an input/output (I/O) element, a register, a memory block, or a digital signal processor block, of the integrated circuit;
   determining that the one of the nodes fans out to a higher number of nodes than that fanning out from the remaining of the nodes;
   determining that the one of the nodes is connected to a higher number of layers of logic than that connected to the remaining of the nodes;
   determining that the one of the nodes is directly connected to a conductor that has a capacitance higher than a capacitance of a conductor directly connected to the remaining of the nodes;
   determining that the one of the nodes has a lower depth than depths of the remaining of the nodes;
   determining that the one of the nodes consumes a higher amount of power than that consumed by the remaining of the nodes; or
   determining that a first of the signal activities estimated at the one of the nodes has changed by a pre-determined discrepancy from a second signal activity estimated at the one of the nodes.

10. A method in accordance with claim 1, further comprising:
    determining a signal activity at the remaining of the nodes other than the node of interest; and
    foregoing determination of a signal activity upon determining the signal activity at the remaining of the nodes.

11. A method in accordance with claim 1, further comprising:
    estimating a first amount of power at the node of interest based on the estimation of the signal activities;
    estimating a second amount of power at the node of interest based on the determination of the signal activity at the node of interest;
    determining whether a pre-determined amount of change has occurred between the first and second amounts of power;
    foregoing determination of a signal activity at the remaining of the nodes upon determining that the pre-determined amount of change has not occurred; and
    determining signal activity at the remaining of the nodes upon determining that the pre-determined amount of change has occurred.

12. A method in accordance with claim 1, further comprising:
    determining whether a pre-determined amount of change has occurred between the estimated signal activity at the node of interest and the determined signal activity at the node of interest;
    foregoing determination of a signal activity at the remaining of the nodes upon determining that the pre-determined amount of change has not occurred; and
    determining signal activity at the remaining of the nodes upon determining that the pre-determined amount of change has occurred.

13. A system comprising:
    a host computing device; and
    an integrated circuit coupled to the host computing device via a cable, wherein said host computing device is configured to:

compile a design of the integrated circuit including a plurality of nodes;

estimate signal activities at the nodes;

determine a node of interest from the nodes; and make a determination to connect a signal activity circuit to the node of interest wherein the signal activity circuit comprises:

a synchronizer connected to the output of the node of interest;

a static probability counter connected to an output of the synchronizer; and an oscillator configured to supply a clock signal to a clock input of the synchronizer and to a clock input to the static probability counter.

14. A system in accordance with claim 13, wherein said host computing device is configured to forego determination of signal activity at the remaining nodes.

15. A system in accordance with claim 13, wherein the signal activity circuit comprises:

a flip-flop connected to the output of the synchronizer;

a gate connected to an output of the flip-flop;

a toggle rate counter connected to an output of the gate; and an oscillator configured to supply a clock signal to a clock input of the flip-flop and to a clock input of the toggle rate counter.

16. A system in accordance with claim 13, wherein said host computing device includes a housing and said integrated circuit is located outside said housing.

17. A non-transitory computer-readable storage medium having computer-executable instructions stored thereon which, when executed by a computer, causes the computer to perform signal activity extraction in an integrated circuit, the method comprising:

compiling a design of the integrated circuit including a plurality of nodes;

estimating signal activities at the nodes;

determining a node of interest from the nodes; and making a determination to connect a signal activity circuit to the node of interest; wherein the signal activity circuit comprises:

a synchronizer connected to the output of the node of interest;

a static probability counter connected to an output of the synchronizer; and an oscillator configured to supply a clock signal to a clock input of the synchronizer and to a clock input to the static probability counter.

18. A computer-readable storage medium in accordance with claim 17, the method further comprising optimizing power consumed by the node.

* * * * *